Oct. 2, 1934. O. G. TINKEY 1,975,337
REFRIGERATING APPARATUS
Filed July 29, 1932

INVENTOR.
Otto G. Tinkey
BY
ATTORNEY.

Patented Oct. 2, 1934

1,975,337

UNITED STATES PATENT OFFICE 1,975,337

REFRIGERATING APPARATUS

Otto G. Tinkey, Los Angeles, Calif.

Application July 29, 1932, Serial No. 625,800

4 Claims. (Cl. 62—103)

My invention relates to refrigerating apparatus, and more particularly to improvements in the baffle means and drip catching troughs which affect the circulation of the air and which catch drippings from the pipes through which the refrigerant passes, and it has among its salient objects to provide a new arrangement of baffle and drip catching means whereby a more effective and unobstructed circulation course is provided for the air without using space which is needed for that which is to be kept or exhibited in the refrigeration case.

In order to explain my invention more particularly, I have illustrated the same as it would be embodied in the top part of a show case or refrigeration case in which merchandise is kept.

Figure 2:
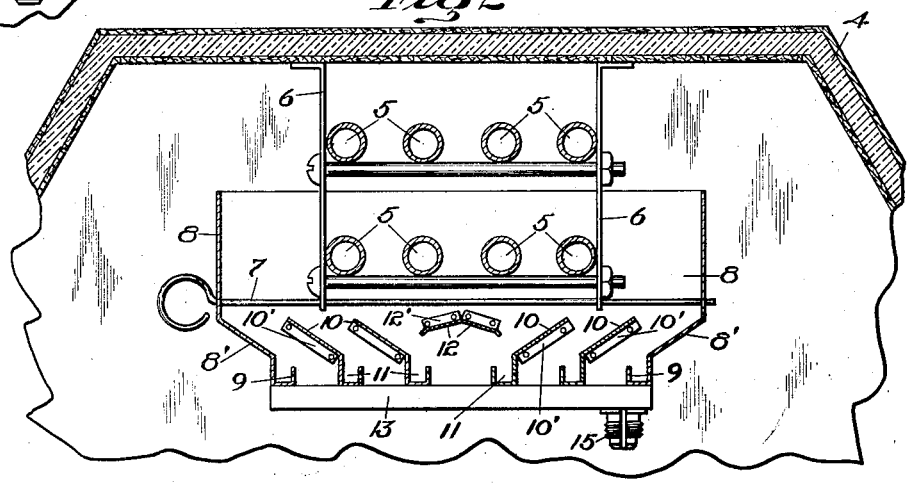
Figure 2 is a vertical cross sectional view through the top portion of a refrigeration case.

Referring in detail to the drawing, it will be understood that any type of case can be used and any number and size of pipes for the refrigerant can be used. In the drawing, the top of the case is designated 4, and the pipes are designated 5, 5, supported in suitable suspension brackets or frames, designated as a whole 6, 6. Supported by the lower ends of said suspension brackets, 6, 6, by means of through rods 7, 7, is a surrounding shell or box 8, open in its top and having its side walls bent inwardly, as at 8', and terminating in a trough-like member 9. A series of inclined baffle members, 10, 10, are extended from one end of said box 8 to the other, and are secured at their ends by being bent to form flanges, as 10', and riveted to the ends of the box member 8, as clearly seen in Fig. 2. Each of said baffle members 10 terminates in a trough 11, similar to the troughs 9, 9. In the middle part of said box structure 8, below said pipes, and inclined downwardly in opposite directions is a central baffle member 12, secured at its ends to the opposite ends of the box 8, as at 12', the lower edges of said member 12, being above the two inner troughs 11, 11, as clearly seen in Fig. 2.

Figure 1:
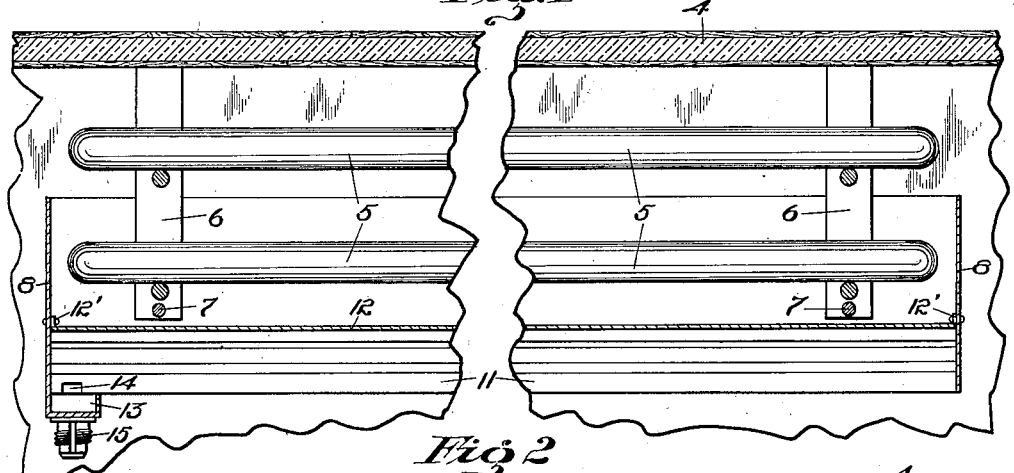
Figure 1 is a fragmentary view, in longitudinal section, showing the pipes and the baffle and drip catching means.

An important feature of this invention and that which gives the efficiency in circulation is the fact that the trough members 9 and 11 have their top portions below the line of inclination of the baffle members 8' and 10, so that if the line of this inclination were extended in each instance, it would pass over the upturned edge forming the trough in a direct line and not be intercepted thereby, and this gives an increased area for air to pass down between said baffle members in a direct line and not be intercepted and caused to eddy or whirl. At the ends of said troughs there is a transverse trough 13 and into which the troughs 9, 9, and 11, 11, discharge the drippings from the pipes 5. Said troughs are each provided with an opening, as 14, Fig. 1, discharging into said trough 13, and said trough 13 is provided at its end with a discharge outlet, as 15, adapted to be connected for proper drainage, as may be desired.

Figure 3:
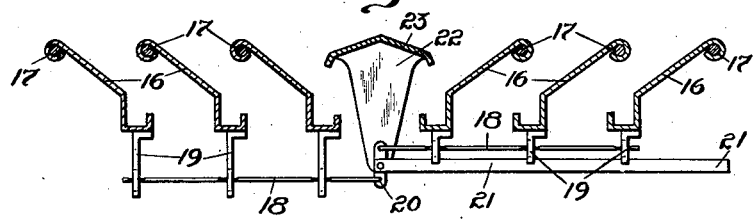
Figure 3 is a sectional view through a series of baffle and drip-catching members pivotally mounted for slight adjustment.

In Fig. 3, I have shown a slight modification of the invention, the baffle members being designated 16, pivotally supported as at 17, and connected by means of rods 18, and extensions 19 thereunder, to a rocker member 20, on the end of an operating rod 21, whereby said troughs and baffle members 16, 16, can be simultaneously rocked toward the center by the raising and lowering slightly of the outer end of the operating rod 21. At the opposite ends of the baffle members are supporting members, as 22, to which the rocker member 20 is pivotally connected, and upon which is also mounted the middle baffle member 23, with its opposite edges overlying the innermost troughs, as clearly shown. It will thus be seen that the entire area under the pipes is covered by drip catching means and at the same time there are the parallel passageways with maximum open uninterrupted ways for the air to pass downwardly without being turned back upon itself, as it would if it were intercepted by upturned edges in its direct flow path.

Thus by making provision for adjusting the baffle members 16, as just described, it will be seen that the circulation spaces therebetween can be regulated and either a maximum circulation permitted, or a reduced circulation allowed, thus making it possible also to control the relative humidity of the food compartment. That is, for any given temperature in the food compartment increase in the speed of circulation causes an increase in the temperature of the cooling coils, and this increase in the temperature of the cooling coils causes a decrease in the amount of moisture condensed from the circulating air, thereby raising the relative humidity of the circulating air. By the adjustability of these baffle members, relative humidity in the food compartment can be regulated to suit the requirements of the different kinds of foods or other products stored therein.

While I have shown and described in detail one practical embodiment of my invention, I am aware that many changes in details of construction and arrangement can be made therein without departing from the spirit of the invention, and I do not therefore, limit the invention to the showing made for explanatory purposes, except as I may be limited by the hereto appended claims.

I claim:

1. In combination with refrigerating coils, of drip catching baffle means thereunder consisting of a series of parallel, inclined members, each having along its lower edge a trough portion the outer edge of which lies below the plane of the inclination, said members being pivotally supported at their upper edges with means connecting their lower ends whereby the trough edges can be simultaneously moved together to vary the inclination slightly.

2. In combination with refrigerating coils, of drip catching baffle means thereunder consisting of two series of parallel, inclined members, at opposite sides of the center line and the members of each series inclining downwardly toward the center line and each having along its lower edge a trough portion the outer edge of which is below the line of inclination extended, whereby the inclined members of each series are parallel with each other in their inclination, the trough portion of one member underlying the upper edge of an adjacent member.

3. In combination with refrigerating coils, of drip catching baffle means thereunder arranged in two series of inclined members extended lengthwise under said coils and inclined inwardly and downwardly and each provided along its lower edge with a trough, the trough of one member underlying the upper edge of an adjacent member said inclined members being pivotally supported at their upper edges, a middle deflecting member above and overlying the troughs of the two innermost members inclined toward each other, and means connecting the lower ends of said two series of inclined members for simultaneously swinging them toward or away from each other.

4. In combination with refrigerating coils, of drip catching baffle means thereunder consisting of two series of parallel, inclined members, at opposite sides of the center line and the members of each series inclining downwardly toward the center line and each having along its lower edge a trough portion the outer edge of which is below the line of inclination extended, whereby the inclined members of each series are parallel with each other in their inclination, the trough portion of one member underlying the upper edge of an adjacent member, said inclined members being supported in a frame which is removably supported beneath the coils, whereby the various inclined members can be removed bodily.

OTTO G. TINKEY.